United States Patent
Yamamoto et al.

(10) Patent No.: US 9,959,489 B2
(45) Date of Patent: May 1, 2018

(54) NETWORK SYSTEM, PRINTING DEVICE, AND CONTROL METHOD OF A PRINTING DEVICE

(71) Applicant: Seiko Epson Corporation, Tokyo (JP)

(72) Inventors: Takayuki Yamamoto, Matsumoto (JP); Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/333,408

(22) Filed: Oct. 25, 2016

(65) Prior Publication Data
US 2017/0132499 A1    May 11, 2017

(30) Foreign Application Priority Data
Nov. 9, 2015 (JP) .................. 2015-219281

(51) Int. Cl.
G06K 15/02 (2006.01)
G06Q 20/20 (2012.01)
H04L 29/08 (2006.01)

(52) U.S. Cl.
CPC ....... G06K 15/1803 (2013.01); G06K 15/022 (2013.01); G06K 15/028 (2013.01); G06K 15/1805 (2013.01); G06K 15/1806 (2013.01); G06K 15/1818 (2013.01); G06Q 20/202 (2013.01); G06Q 20/209 (2013.01); H04L 67/10 (2013.01); G06K 2215/0011 (2013.01)

(58) Field of Classification Search
USPC ...................................... 358/1.15
See application file for complete search history.

(56) References Cited

U.S. PATENT DOCUMENTS

2005/0242178 A1* 11/2005 Minowa ............ G06Q 30/0225
                                                                235/383
2008/0133374 A1*  6/2008 Nobutani ............. G06Q 20/20
                                                                705/24
2014/0313532 A1* 10/2014 Nakamura ........... G06F 3/1259
                                                                358/1.13

FOREIGN PATENT DOCUMENTS

JP     2006-129362 A    5/2006
JP     2009-177489 A    8/2009

* cited by examiner

Primary Examiner — Ngon Nguyen
(74) Attorney, Agent, or Firm — Foley & Lardner LLP (57) ABSTRACT

Delaying processing based on received commands is suppressed while preventing executing parallel processes involving operation of hardware. Servers can send printing commands and non-printing commands to a printing device. When a printing command is received from a first server and a printing command is then received from another server different from the first server while a process based on the printing command received from the first server is executing, the printing device does not execute the process based on the printing command received from the other server; but if a non-printing command is received from another server, the printing device executes a process based on the non-printing command received from the other server parallel to the process based on the printing command received from the first server.

10 Claims, 4 Drawing Sheets

NETWORK SYSTEM, PRINTING DEVICE, AND CONTROL METHOD OF A PRINTING DEVICE

Priority is claimed under 35 U.S.C. § 119 to Japanese Application nos. 2015-219281 filed on November 9, which is hereby incorporated by reference in their entirety.

BACKGROUND

1. Technical Field

The present disclosure relates to a network system, printing device, and control method of a printing device.

2. Related Art

JP-A-2006-129362 describes a network system in which a server connects to multiple digital multifunction devices through a network, and the firmware of all digital multifunction devices on the network is updated by updating the firmware on one of the digital multifunction devices or the server on the same network.

Printing devices that print on recording media and can also access a network are increasingly common. When a command involving operation of printer hardware is received from one of the multiple servers connected to the network, such printing devices execute a process based on the command. To prevent executing parallel processes involving hardware operations, the printing device may be configured to not execute a process based on a command received from another server while already executing a process involving a hardware operation. Because printing devices so configured do not execute a process based on a received command while executing a process involving a hardware operation, the process of the received command is delayed.

SUMMARY

An objective of the present disclosure is to prevent executing a process involving a parallel hardware operation while executing a process involving a hardware operation while also suppressing delays in processes based on received commands.

To achieve the foregoing objective in a network system according to the disclosure having a plurality of servers and a printing device that prints to recording media connected through a network: the servers are configured to transmit a first command belonging to a first command group instructing executing a process involving operation of hardware in the printing device, or a second command belonging to a second command group instructing executing a process not involving operation of hardware in the printing device; and if the printing device receives a first command from one server and is executing a process based on the received first command, the printing device does not execute a process based on a first command received from another server that is different from the one server, but if a second command is received from another server, executes the process based on the received second command parallel to the process based on the first command received from the one server.

If the printing device is executing a process based on a first command when another first command is received from another (second) server, the printing device does not run the process based on the first command received from the second server, but if a second command is received from the other server, executes a process based on the second command. As a result, the printing device can prevent delaying a process based on a command received while running a process involving operation of hardware, and can prevent executing parallel processes involving operation of hardware.

In a network system according to another aspect of the disclosure, if the first command is received from one server and a first command is then received from another server while executing the process based on the first command received from the one server, the printing device defers executing the process based on the first command received from the other server, and executes the process based on the first command received from the other server after executing the process based on the first command received from the one server.

The printing device in this configuration runs the process based on a first command received from a different server after executing the process based on a first command received from one server, and can run a process involving operation of hardware based on a first command received from another server while preventing executing parallel processes involving operation of hardware.

In a network system according to another aspect of the disclosure, if the first command is received from one server and a first command and then a second command are received from another server while executing the process based on the first command received from the one server, the printing device defers executing the process based on the first command and second command received from the other server, and executes the process based on the first command and second command received from the other server after executing the process based on the first command received from the one server.

The printing device in this configuration defers executing processes based on a first command and a second command received from another (second) server, and after executing the process based on a first command received from a first server, sequentially executes the processes based on the first command and second command received from the second server. As a result, when the received second command is a command instructing executing a process that depends on a process based on the first command, the printing device can prevent executing a process based on the second command when the process based on the first command cannot be referenced, and can appropriately execute processes based on a first command and second command received from another server.

In a network system according to another aspect of the disclosure, the first command is a command instructing executing a process involving a printing operation; and the second command is a command instructing transmitting information related to the printing device.

When a second command is received while executing a printing operation, the printing device in this configuration can, parallel to the printing operation, send information related to the printing device to the server that sent the second command.

To achieve the foregoing objective, another aspect of the disclosure is a printing device configured to connect through a network to multiple servers, and having: a communicator that communicates with the servers; and a controller. The controller is configured to execute a process based on a first command when a first command belonging to a first command group instructing executing a process involving operation of hardware is received from one server; not execute a process based on a first command received from another server different from the one server if a first command is received from another server different from the one server while executing the process based on the first command received from the one server; and execute a process based on a received second command when a second command belonging to a second command group instructing executing a process not involving operation of hardware is received from another server different from the one server while executing the process based on the first command received from the one server.

If the printing device is executing a process based on a first command when another first command is received from another (second) server, the printing device does not run the process based on the first command received from the second server, but if a second command is received from the other server, executes a process based on the second command. As a result, the printing device can prevent delaying a process based on a command received while running a process involving operation of hardware, and can prevent executing parallel processes involving operation of hardware.

To achieve the foregoing objective, another aspect of the disclosure is a control method of a printing device that connects through a network to multiple servers, the control method including, while executing a process based on a first command when a first command belonging to a first command group instructing executing a process involving operation of hardware is received from one server: not executing a process based on a first command received from another server different from the one server if a first command is received from another server different from the one server; and executing a process based on a received second command when a second command belonging to a second command group instructing executing a process not involving operation of hardware is received from another server different from the one server, If the printing device is executing a process based on a first command when another first command is received from another (second) server, the printing device does not run the process based on the first command received from the second server, but if a second command is received from the other server, executes a process based on the second command. As a result, the printing device can prevent delaying a process based on a command received while running a process involving operation of hardware, and can prevent executing parallel processes involving operation of hardware.

Other objects and attainments together with a fuller understanding of the disclosure will become apparent and appreciated by referring to the following description and claims taken in conjunction with the accompanying drawings.

DESCRIPTION OF EMBODIMENTS

Figure 1:
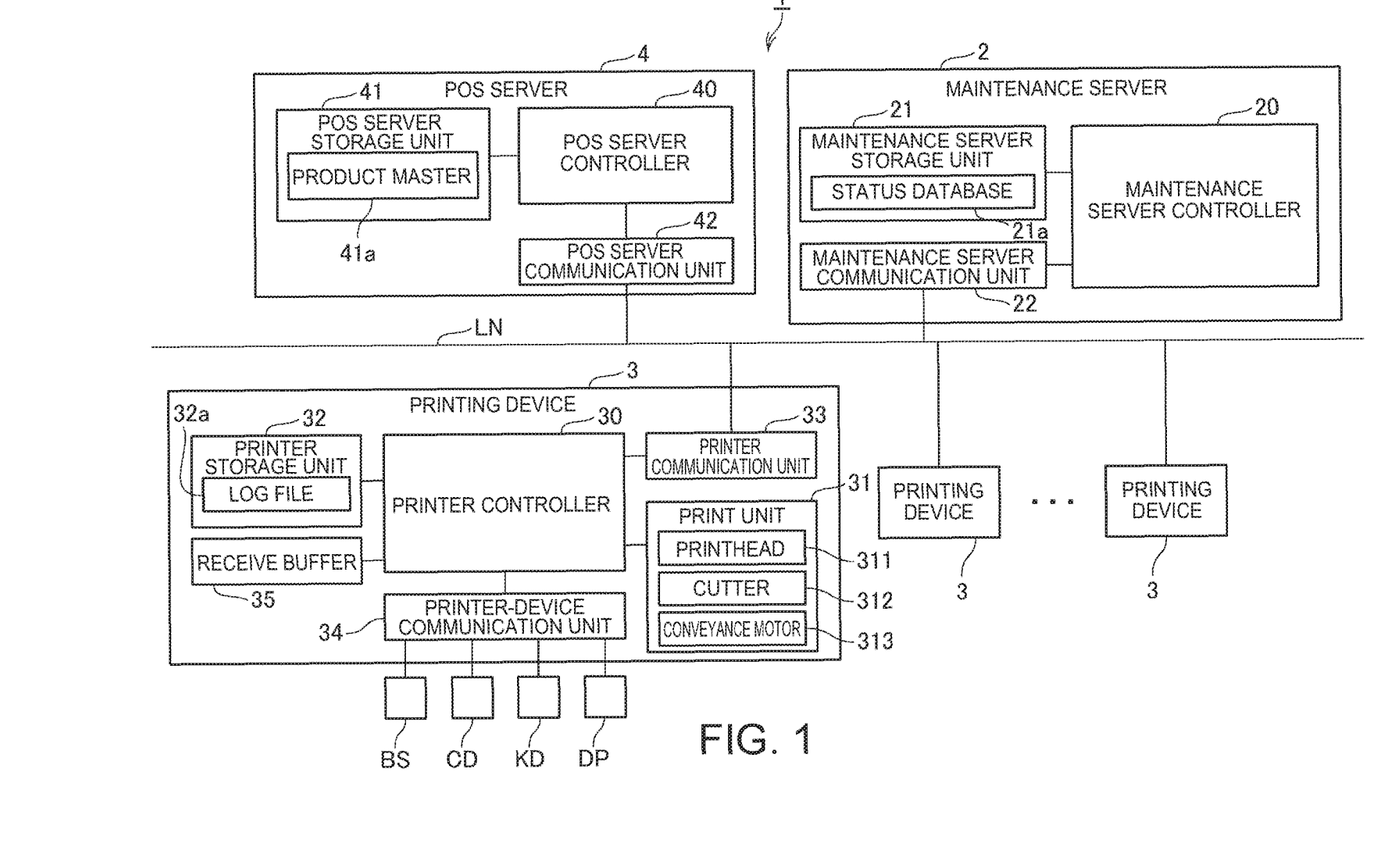
FIG. 1 illustrates the configuration of a store system.

A preferred embodiment of the present disclosure is described below with reference to the accompanying figures.
FIG. 1 illustrates the configuration of a store system 1 (network system) according to this embodiment of the disclosure. The store system 1 is a store system for processing transactions based on the products or services sold in a supermarket, convenience store, department store, or restaurant, for example.

As shown in FIG. 1, the store system 1 comprises a maintenance server 2 (server), one or more printing devices 3, and a POS server (server). The maintenance server 2, printing devices 3, and POS server 4 connect to the local area network LN (network) of the store system 1.

Any suitable communication protocol may be used for communication through the local area network LN, and communication over the local area network LN may be wired or wireless.

The maintenance server 2 is a server that communicates with the printing devices 3 and manages the status of the printing devices 3. As shown in FIG. 1, the maintenance server 2 includes a maintenance server controller 20, maintenance server storage unit 21 (maintenance server memory), and maintenance server communication unit 22 (maintenance server communicator).

The maintenance server controller 20 comprises a CPU, ROM, RAM, and other peripheral circuits not shown, and controls the maintenance server 2.

The maintenance server storage unit 21 includes a hard disk drive, EEPROM device, or other nonvolatile memory not shown, and nonvolatilely stores data. The maintenance server storage unit 21 also stores a status database 21a described below.

The maintenance server communication unit 22 accesses the local area network LN and communicates with other devices connected to the local area network LN (including printing devices 3) as controlled by the maintenance server controller 20.

The printing device 3 is a device with a printing function, and is disposed to the checkout counter in a store where customer transactions are processed, for example. The printing device 3 is a thermal line printer that stores roll paper (recording media) (not shown in the figure), and prints images by forming dots on the roll paper by a thermal head. As shown in FIG. 1, the printing device 3 has a printer controller 30 (controller), print unit 31 (print mechanism), printer storage unit 32 (memory), printer communication unit 33 (communicator), printer-device communication unit 34 (printer-device communicator), and receive buffer 35.

The printer controller 30 has a CPU, ROM, RAM, and other peripheral circuits not shown, and controls the printing device 3.

The print unit 31 has a print mechanism including a printhead 311 (hardware), cutter 312 (hardware), and conveyance motor 313 (hardware).

The printhead 311 is a thermal line head having multiple heat elements arrayed according to the desired printing resolution in the direction crosswise to the conveyance direction of the roll paper, and forms dots on thermal roll paper by heating specific heat elements.

The cutter 312 has a fixed knife and a movable knife, and cuts the roll paper by moving the movable knife relative to the fixed knife so that the movable knife and fixed knife cross.

The conveyance motor 313 causes conveyance rollers (not shown in the figure) to turn and convey the roll paper stored inside the cabinet of the printing device 3.

The print unit 31 prints receipt-related images on the roll paper by the printhead 311 while conveying the roll paper by the conveyance motor 313, and cuts the roll paper at a specific position by the cutter 312 to produce a receipt.

The printer storage unit 32 has a hard disk drive, EEPROM device, or other nonvolatile memory not shown, and nonvolatilely stores data. The printer storage unit 32 also stores a log file 32a described below.

The printer communication unit 33 accesses the local area network LN and communicates with other devices connected to the local area network LN (including the POS server 4 and maintenance server 2) as controlled by the printer controller 30.

The printer-device communication unit 34 has an interface board with a USB port, a port conforming to a serial communication protocol other than USB, or port conforming to another communication protocol. The printer-device communication unit 34 communicates with devices connected to the ports as controlled by the printer controller 30. The printer-device communication unit 34 may also have a wireless communication function, and be configured to to communicate with devices wirelessly.

In the example in FIG. 1 a barcode scanner BS, customer display CD, cash drawer KD, and display DP.

The barcode scanner BS reads barcodes from products and product packaging, and outputs data representing the read result to the printer-device communication unit 34. The printer-device communication unit 34 outputs the data input from the barcode scanner BS to the printer controller 30.

The customer display CD is an LCD display or other type of display device, and displays information as controlled by the printer controller 30. Information displayed on the customer display CD can be seen by the customer in the transaction at the checkout counter.

The cash drawer KD has a tray for holding money, mechanisms for locking and unlocking the tray, and a mechanism for kicking out the tray, and releases the lock and kicks out the tray as controlled by the printer controller 30.

The display DP is an LCD display or other type of display device, and displays information as controlled by the printer controller 30. Information presented on the display DP can be read by the checkout clerk operating the register at the checkout counter.

The receive buffer 35 is a temporary storage area referred to as RAM, and may be a semiconductor memory device, for example. The receive buffer 35 stores commands received from an external device by the printer communication unit 33 as controlled by the printer controller 30.

The POS server 4 is a server that communicates with the printing device 3 and controls the printing device 3. As shown in FIG. 1, the POS server 4 includes a POS server controller 40, POS server storage unit 41 (POS server memory), and POS server communication unit 42 (POS server communicator).

The POS server controller 40 comprises CPU, ROM, RAM, and other peripheral circuits not shown, and controls the POS server 4.

The POS server storage unit 41 has a hard disk drive, EEPROM device, or other nonvolatile memory not shown, and nonvolatilely stores data. The POS server storage unit 41 also stores a product master 41a. The product master 41a relationally stores for the products sold in the store information representing the product code of the product, information about the product price, and other product-related information.

The POS server communication unit 42 accesses the local area network LN and communicates with devices (including the printing devices 3) connected to the local area network LN as controlled by the POS server controller 40.

Figure 2:
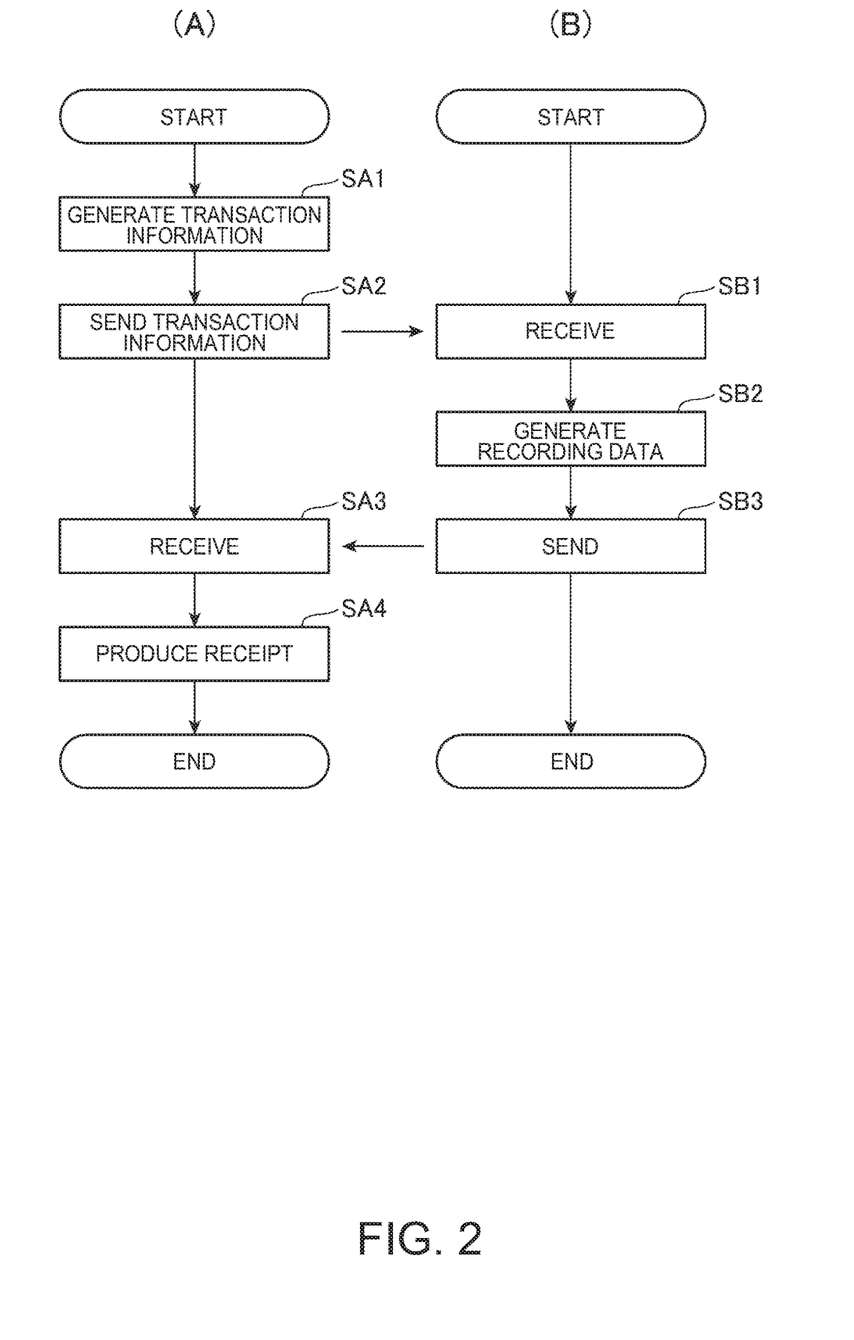
FIG. 2 is a flow chart of the operation of a printing device and POS server.

The basic operation of the printing device 3 and POS server 4 when producing a receipt is described next.

FIG. 2 is a flow chart of the operation of the printing device 3 and POS server 4 when producing a receipt. FIG. 2 (A) shows the operation of the printing device 3, and (B) shows the operation of the POS server 4.

As shown in FIG. 2 (A), the printer controller 30 of the printing device 3 generates transaction information, which is information about the transaction (step SA1).

The transaction information is information including: identification information uniquely assigned to each transaction (referred to below as the transaction ID) to identify a particular transaction; information denoting the combination of product code, name, price, and quantity for each product purchased by the customer (referred to below as the purchased product information); information denoting the subtotal, the cash amount received from the customer, and the change returned to the customer (referred to below as transaction amount information); information denoting the time of the transaction (referred to below as the transaction time information); and store ID identifying the store (business) where the transaction was completed.

The printer controller 30 also has a function for generating a transaction ID for each transaction, and generates the transaction ID using this function.

When the checkout clerk uses the barcode scanner BS to read the barcode from the product or packaging of the product purchased by the customer, the printer controller 30 acquires the product code of the scanned product. The printer controller 30 controls the printer communication unit 33 to send data querying the name and price of the product identified by the acquired product code to the POS server 4. The POS server controller 40 of the POS server 4 receives the data and acquires the product code based on the received data. The POS server controller 40 references the product master 41a stored by the POS server storage unit 41 to acquire the name and price corresponding to the acquired product code. The POS server controller 40 then sends information denoting the acquired product name and price to the printing device 3 by the POS server communication unit 42. The printer controller 30 of the printing device 3 then generates the purchased product information based on the received information.

The printer controller 30 also acquires from the POS server 4 transaction amount information indicating the amount of the products purchased by the customer. The amount expressed by the transaction amount information is calculated by the POS server controller 40 based on the product master 41a.

The printer controller 30 also generates transaction time information based the time the Enter key is operated to finalize a transaction. This Enter key is on a touch panel in this example. Note that the time expressed by the transaction time information is not limited to when the Enter key is operated, and may be any time derived from the transaction, such as the time the barcode of the first product in the transaction was scanned.

After generating the transaction information, the printer controller 30 sends transaction data expressing the generated transaction information to the POS server 4 by the printer communication unit 33 (step SA2).

As shown in FIG. 2 (B), the POS server controller 40 of the POS server 4 controls the POS server communication unit 42 to receive the transaction data (step SB1). Next, the POS server controller 40 generates recording data instructing producing a receipt in a specific layout based on the transaction information expressed by the received transaction data (step SB2).

The recording data is control data instructing producing a receipt according to a specific layout, and in this example including a top logo, bottom logo, transaction ID, the time of the transaction, the name, price, quantity and total amount of the products purchased by the customer, the amount received from the customer, and the amount of change due to the customer. The recording data is control data including commands instructing executing a process involving operation of the print mechanism.

After generating the recording data, the POS server controller 40 controls the POS server communication unit 42 to send the recording data to the printing device 3 (step SB3).

As shown in FIG. 2 (A), the printer controller 30 of the printing device 3 controls the printer communication unit 33 to receive the recording data (step SA3). Next, the printer controller 30 sequentially stores the commands contained in the recording data as the recording data is received in the receive buffer 35. The printer controller 30 then sequentially outputs the commands stored in the receive buffer 35 to produce a receipt by the print unit 31 (step SA4).

The receipt produced in step SA4 is then given by the checkout clerk to the customer when the transaction is completed at the checkout counter.

Figure 3:
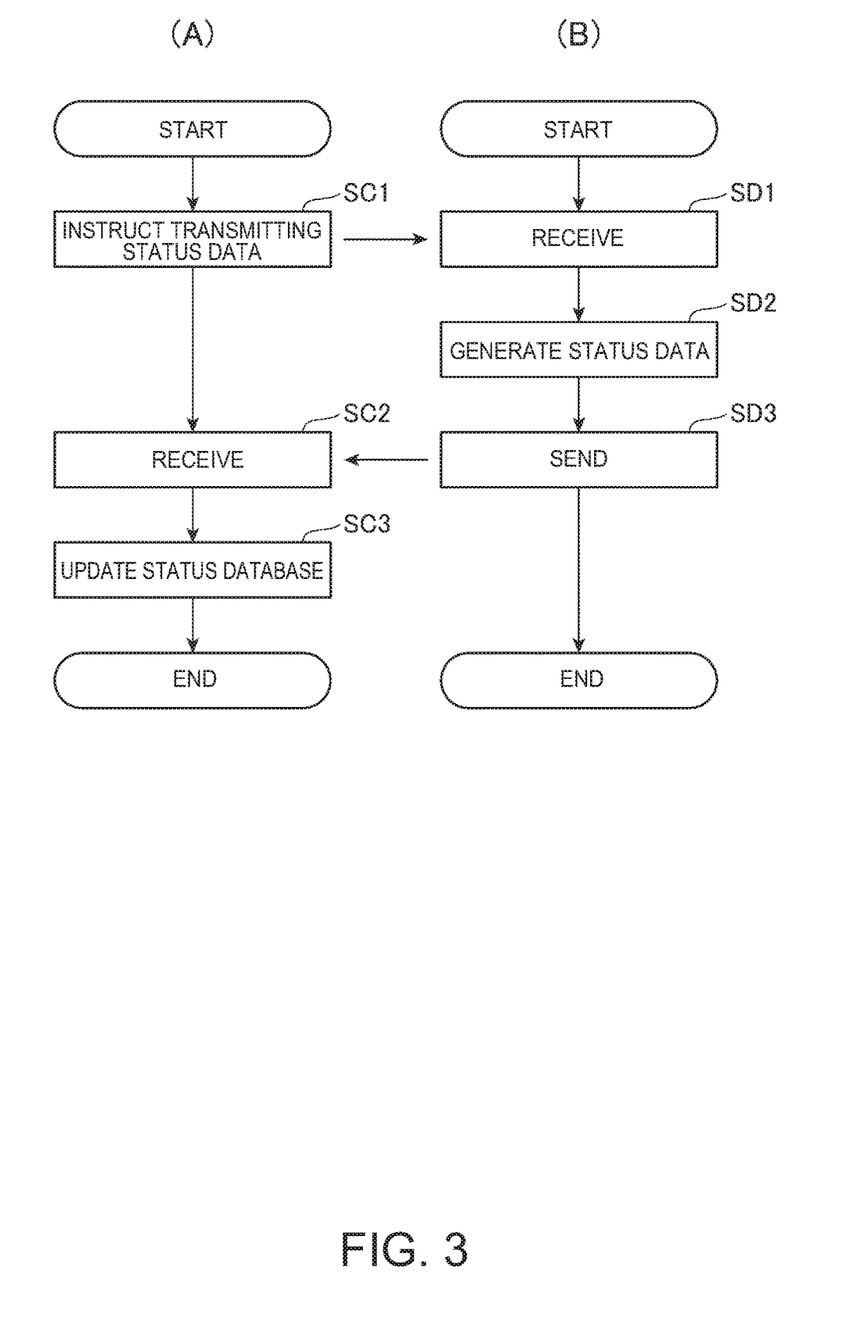
FIG. 3 is a flow chart of the operation of a printing device and maintenance server.

The basic operation of the printing device 3 and maintenance server 2 is described next.

FIG. 3 is a flow chart of the operation of the printing device 3 and maintenance server 2. FIG. 3 (A) shows the operation of the maintenance server 2, and (B) shows the operation of the printing device 3.

As described above, the maintenance server 2 is a server that manages the status of the printing devices 3 in the store system 1. the maintenance server controller 20 of the maintenance server 2 therefore controls the maintenance server communication unit 22 to send request data instructing sending status data including information about the status of each printing device 3 to the printing devices 3 (step SC1). The request data is control data including commands instructing transmitting information related to the printing device 3, and in this example the commands include a command instructing transmitting information indicating the status of the printing device 3. Note that the transmitted data does not include a command instructing executing a process involving operation of the print mechanism.

As shown in FIG. 3 (B), the printer controller 30 of the printing device 3 controls the printer communication unit 33 to receive the request data (step SD1). Next, the printer controller 30 generates status data based on the log file 32a stored by the printer storage unit 32, for example (step SD2).

The log file 32a is a file to which log information is written.

The log information is a record of multiple log items.

A log item is a state that is monitored for changes, and is previously defined as a log item to be monitored and recorded (logged). Examples of log items in this embodiment of the disclosure include at least printer errors, the total number of lines formed by the printhead, and the total number of times the cutter was used.

Note that these are examples of log items used in this embodiment of the disclosure, and other items may be logged in addition to the foregoing items or instead of one or more of the foregoing items. For example, other log items may include items related to devices connected to the printer 3, and items related to communication (such as the data transfer rate).

Information indicating if a printer error occurred, information indicating if the printer error was resolved, and information indicating the date and time are recorded chronologically as a log of printer errors in the log file 32a.

A printer error occurs when normal printing is not possible, such as when the roll paper runs out, the roll paper jams, or the printhead 311 overheats.

The printer controller 30 monitors if a printer error occurred and if the printer error was resolved (log item: monitor status of printer error), and records a log of printer error log items in the log file 32a.

Information denoting the total number of lines printed by the printhead, and information denoting the time and date, are recorded chronologically in the log file 32a as a log of total printed line count log items.

The total printed line count is the total number of lines printed by the printhead 311. As described above, the print unit 31 of the printing device 3 in this embodiment of the disclosure prints images by repeatedly alternating between forming one line of dots with the printhead 311, and conveying the roll paper one line by the conveyance mechanism. As also described above, printing a line means forming one line of dots with the printhead 311.

The printer controller 30 acquires the total number of lines printed by the printhead at a specific interval (log item: monitor total printed line count), and records a log of total printed line count log items in the log file 32a.

Information denoting the cumulative total number of times the cutter is used, and information denoting the time and date, are recorded chronologically in the log file 32a as a log of total cutter operation count log items. The total cutter operation count is the total number of times the cutter 312 cuts the roll paper.

The printer controller 30 acquires the total cutter operation count at a specific interval (log item: monitoring the total cutter operation count) and records a log of total cutter operation count log items in the log file 32a.

The printer controller 30 of the printing device 3 generates status data combining the printer ID identifying a specific printing device 3 with log item identification information identifying a particular log item and the log information for each log item. The printer controller 30 then transmits the generated status data to the maintenance server 2 (step SD3).

As shown in FIG. 3 (A), the maintenance server controller 20 of the maintenance server 2 controls the maintenance server communication unit 22 to receive the status data (step SC2). When status data is received, the maintenance server controller 20 updates the status database 21a based on the received status data (step SC3). The process of step SC3 is described below.

The status database 21a is a database of data records related to the printing devices 3 connected to the local area network LN of the store system 1. Each record in the status database 21a relationally stores at least printer identification information, printer error information, printhead error information, and cutter error information.

The printer error information is information indicating whether or not a printer error has occurred, and either a value indicating that a printer error occurred or a value indicating that a printer error did not occur.

The printhead error information is information indicating whether or not a printhead error has occurred, and either a value indicating that a printhead error occurred or a value indicating that a printhead error did not occur. A printhead error occurs when the total number of lines printed by the printhead 311 exceeds a specific threshold used as a reference for determining the life of the printhead 311.

The cutter error information is information indicating whether or not a cutter error has occurred, and either a value indicating that a cutter error occurred or a value indicating that a cutter error did not occur. A cutter error occurs when the total number of operations of the cutter 312 exceeds a specific threshold used as a reference for determining the life of the cutter 312.

In step SC3 the maintenance server controller 20 acquires the printer status information contained in the status data. As described above, the printer status information contains sets of log item ID and log item log information for each log item.

Next, the maintenance server controller 20 identifies the matching record (the record with printer ID of the same value as the printer ID of the printer identification information in the status data) in the status database 21*a* by comparing the printer IDs. Next, the maintenance server controller 20 updates the printer error information, printhead error information, and cutter error information in the record that was found based on the acquired printer status information.

More specifically, based on the printer error log information (log item log information) contained in the printer status information, the maintenance server controller 20 determines if a printer error occurred; if an error occurred, changes the value of the printer error information to the value indicating a printer error occurred; and if an error has not occurred, changes the value of the printer error information to the value indicating a printer error has not occurred.

Based on the total printed line count log information (log item log information) contained in the printer status information, the maintenance server controller 20 determines if the total printed line count exceeds a specific threshold; changes the value of the printhead error information to the value indicating a printhead error occurred if the specific threshold was exceeded; and if the specific threshold was not exceeded, changes the value of the printhead error information to the value indicating a printhead error has not occurred.

Based on the total cutter operation count log information (log item log information) contained in the printer status information, the maintenance server controller 20 determines if the total cutter operation count exceeds a specific threshold; changes the value of the cutter error information to the value indicating a cutter error occurred if the specific threshold was exceeded; and if the specific threshold was not exceeded, changes the value of the cutter error information to the value indicating a cutter error has not occurred.

As described above, the maintenance server 2 acquires status data from the printing devices 3, and manages the status of printing devices 3 in the store system 1. The maintenance server 2 also provides information that is useful for printing device 3 maintenance to the maintenance technician responsible for maintaining the printers 3 in the store system 1 based on the status database 21*a*.

As described above, the POS server 4 and maintenance server 2 send control data to the printing devices 3. The printing devices 3 execute processes based on the commands contained in the received control data. In the example described above, the POS server 4 sends recording data, and the printing devices 3 print based on the commands contained in the received recording data. The maintenance server 2 also transmits request data, and based on the commands contained in the request data, the printing device 3 generates and sends status data containing information indicating the status of the printing device 3 to the maintenance server 2.

The commands included in the control data sent by the POS server 4 and maintenance server 2 belong to one of the following command groups in this embodiment of the disclosure. Specifically, the commands belong to a command group (first command group) instructing executing processes involving operation of the print mechanism (referred to below as the printing command group); or a command group (second command group) instructing transmitting information related to the printing device 3 (referred to below as the non-printing command group).

Commands (first commands) in the printing command group (referred to below as printing commands), and commands (second commands) in the non-printing command group (referred to below as non-printing commands) are described below.

Examples of printing commands are print commands instructing printing, paper feed commands instructing conveying the roll paper, and cutter commands instructing cutting the roll paper. More specifically, printing commands are commands instructing executing processes that involve operating the print mechanism, including the printhead 311, cutter 312, and conveyance motor 313. Other examples of printing commands include image buffer instantiation commands, image data rendering commands, and text data rendering commands.

An image buffer instantiation command is a command instructing instantiating an image buffer of a size corresponding to the printing area in RAM or other temporary storage. An image data rendering command is a command instructing rendering image data in the image buffer. A text data rendering command is a command instructing rendering text data in the image buffer. Such commands are not commands that directly instruct operating the print mechanism and executing a process. However, after executing the processes based on these commands, the printing device 3 operates the print mechanism based on the results of those processes. These commands therefore belong as printing commands in the printing command group. The printing commands also include print command codes, which are command codes instructing executing a process involving operation of the print mechanism.

Examples of non-printing commands include commands instructing transmitting status data, commands for transmitting information identifying the model of the printing device 3, and commands for transmitting identification information for a particular printing device 3. Non-printing commands are commands not involving operation of the print mechanism, and are commands instructing transmitting information related to the printing device 3 (including information indicating the printing device 3 status). A non-printing command includes a non-printing command code, which is a command code instructing executing a process not involving operation of the print mechanism.

In the example of POS server 4 operation described above, the recording data includes printing commands, and the POS server 4 sends sends commands instructing printing to the printing device 3.

In the example of maintenance server 2 operation described above, the request data includes non-printing commands, and the maintenance server 2 sends commands instructing transmitting status data to the printing device 3.

However, there are also times when the POS server 4 transmits non-printing commands, and the maintenance server 2 may also transmit printing commands.

In other words, the maintenance server 2 may transmit printing commands when the POS server 4 transmits printing commands and the printing device 3 is executing a process based on the received printing commands.

However, printing devices may be configured to not execute processes based on received commands while executing a command based on a previously received command in order to prevent operating the print mechanism simultaneously. However, because such printing devices do not execute processes based on the commands received later until processing based on the commands received first ends, processing based on the commands that are received later may be delayed. For example, when the POS server 4 communicates first with the printing device 3 and a receipt is being produced, the maintenance server 2 can execute a process with the printing device 3 even if the process does not involve operating the print mechanism until producing the receipt is completed, and the process of the maintenance server 2 may be delayed.

The store system 1 according to this embodiment therefore operates as described below.

Figure 4:
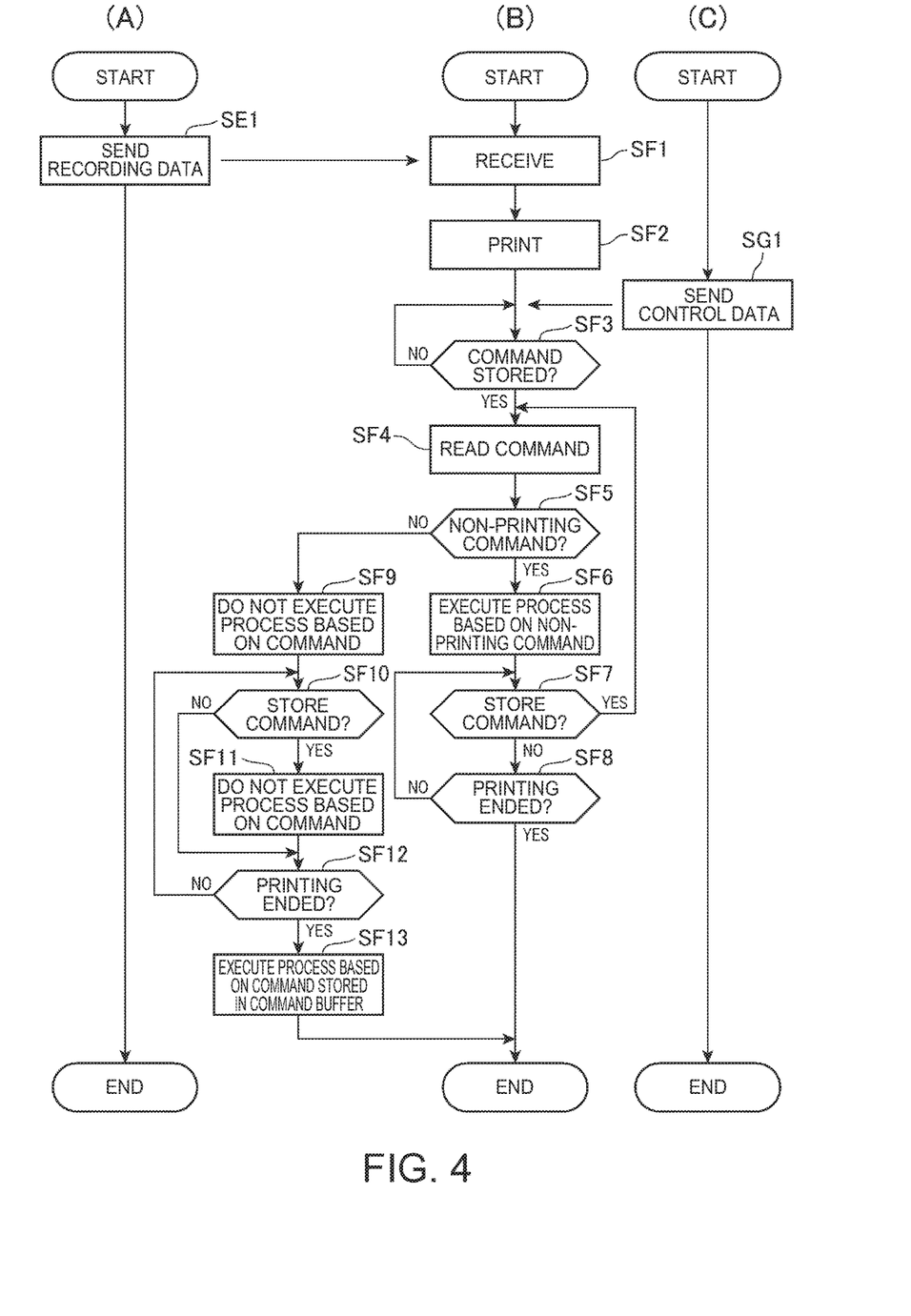
FIG. 4 is a flow chart of the operation of the store system.

FIG. 4 is a flow chart of the operation of the store system 1. FIG. 4 (A) shows the operation of the POS server 4, (B) shows the operation of the printing device 3, and (C) shows the operation of the maintenance server 2.

The printing device 3 has a communication port for exchanging data by communication between the server and a program. The POS server 4 and maintenance server 2 use a specific communication port when to enable data communication with a specific program on the printing device 3. The POS server 4 and maintenance server 2 open a communication connection (a TCP connection if the TCP communication protocol is U-shaped) with the printing device 3 according to a specific communication protocol (such as TCP) using the port number of the specific communication port on the printing device 3 as the destination port number. While a communication connection is open, the POS server 4 and maintenance server 2 can communicate with the printing device 3 through the communication connection that was opened.

In the operation shown in FIG. 4, the printing device 3 receives a command from the POS server 4 and starts executing a process based on the received command before receiving a command from the maintenance server 2.

In other words, as shown in FIG. 4, the POS server controller 40 of the POS server 4 sends recording data to the printing device 3 (step SE1). The printer controller 30 of the printing device 3 receives the recording data (step SF1), and starts printing based on the recording data (step SF2).

Next, the printer controller 30 of the printing device 3 determines if control data (recording data) is received and a command contained in the control data is stored to the receive buffer 35 (step SF3). As described above, commands contained in the control data are sequentially stored to the receive buffer 35 as the control data is received.

As shown in FIG. 4, when the maintenance server controller 20 of the maintenance server 2 sends control data (step SG1), the printer controller 30 determines if a command was stored in the receive buffer 35 (step SF3: YES). When a command is stored in the receive buffer 35, the printer controller 30 reads the command stored in the receive buffer 35 (step SF4). As described above, because commands contained in the control data are sequentially stored in the receive buffer 35 as control data is received, commands contained in the control data are read sequentially as control data is received by the process of steps SF3 and SF4.

Based on the type of command codes contained in the read commands, the printer controller 30 determines if the command is a printing command or a non-printing command (step SF5).

When the commands read from the buffer include a non-printing command, the printer controller 30 recognizes the read command as a non-printing command (step SF5: YES), and executes the process based on the non-printing command parallel to the printing process with the POS server 4 (step SF6).

For example, if the printing device 3 is executing a process related to producing a receipt with the POS server 4, and the maintenance server 2 sends request data including a command instructing transmitting information about the status of the printing device 3, the printing device 3 receives the request data and stores the commands in the request data in the receive buffer 35. Next, the printing device 3 determines based on the type of command code contained in the stored command that the stored command is a non-printing command. The printing device 3 then generates status data and sends the status data to the maintenance server 2 parallel to the process of producing a receipt with the POS server 4. As a result, because the printing device 3 can generate status data and send the status data to the maintenance server 2 while executing the process producing a receipt, delaying process between the printing device 3 and maintenance server 2 while printing a receipt can be prevented.

After executing the process not involving operating the print mechanism, that is, the process based on the non-printing commands, the printing device 3 determines if any new commands were stored in the receive buffer 35 (step SF7). If the printing device 3 determines a command is not stored in the receive buffer 35 (step SF7: NO), the printing device 3 determines if processing based on recording data received from the POS server 4 was completed (step SF8). If processing based on the recording data ended (step SF8: NO), the printing device 3 ends this process.

Returning to step SF5, if the type of command code contained in the read command is a print command code (step SF5: NO), the printing device 3 determines the read command is a printing command and stores the read command in a command buffer (not shown in the figure). More specifically, the printing device 3 does not execute processes based on printing commands received from the maintenance server 2 while executing a process based on printing commands received from the POS server 4 (step SF9). Parallel execution of processes that involve operating the print mechanism can therefore be prevented. Furthermore, because commands such as an image buffer instantiation command are printing commands, the printing device 3 can be reliably prevented from executing parallel processes involving operating the print mechanism.

Next, the printer controller 30 determines if a new command was stored in the receive buffer 35 (step SF10). If a new command was stored in the receive buffer 35 (step SF10: YES), the printer controller 30 stores the command in the command buffer. More specifically, the printer controller 30 does not execute a process based on a command received after a printing command is received from the maintenance server 2 (step SF11).

If the command stored in step SF9 is a command instructing executing a process not involving operating the print mechanism, that is, the stored command is a non-printing command, the printer controller 30 does not execute a process based on the command.

More specifically, while the POS server 4 and printing device 3 are executing a process of producing a receipt, for example, the maintenance server 2 sends a printing command instructing printing, and then sends a non-printing command instructing transmitting information indicating the result of printing based on the printing command. A non-printing command instructing transmitting information indicating the result of printing is, for example, a command instructing transmitting information indicating that printing ended normally, or information indicating that printing did not end normally due to a cover open or no-paper error, for example. In other words, a non-printing command instructing transmitting information indicating the print result is a command not involving operating the print mechanism, but is also a command instructing executing a process based on a printing operation. If a printing command and then a non-printing command are received consecutively from the maintenance server 2 and the printing device 3 executes the process based on the non-printing command, the print result is transmitted even if the process based on the printing command has not executed. The printing device 3 therefore does not execute the command stored in step SF9 even if it is a non-printing command.

In other words, when a printing command and then a non-printing command are received in continuous succession from the maintenance server 2, the printing device 3 defers the processes based on the printing command and non-printing command. As a result, the printing device 3 is prevented from transmitting a print result not based on a printing operation.

As described below the printing device 3 executes the processes based on the printing command and non-printing command received continuously from the maintenance server 2 after executing the process based on the printing command received from the POS server 4. If a printing command and non-printing command are received in the order of the printing command and then the non-printing command, the printing device 3 executes the processes based on these commands in the order the commands were received. As a result, processes based on a printing command and non-printing command received from the maintenance server 2 can be run appropriately while preventing executing a process based on a non-printing command that cannot reference a process based on the printing command. In other words, the printing device 3 can print and then send information indicating the result of the print job to the maintenance server 2.

Referring again to the flow chart, the printer controller 30 determines if the printing process with the POS server 4 was completed (step SF12). If printing in conjunction with the POS server 4 ended (step SF12: YES), the printer controller 30 sequentially reads the commands stored in the command buffer, and executes processes based on the read commands (step SF13).

For example, if the maintenance server 2 sends control data including a printing command while the printing device 3 and POS server 4 are running a printing-related process, the printer controller 30 of the printing device 3 runs the process based on the printing command contained in the control data received from the maintenance server 2 after the printing process with the POS server 4 ends. In this way, the printing device 3 defers processing based on a printing command received from the maintenance server 2 while executing a process based on the command received from the POS server 4, and then executes the process with the maintenance server 2 after the printing process with the POS server 4 ends. The printing device 3 can therefore run the process based on the printing command received from the maintenance server 2 while simultaneous execution of processes involving operating the print mechanism with the POS server 4 and the maintenance server 2 is prevented.

Furthermore, if the maintenance server 2 sends a printing command followed by a non-printing command while the printing device 3 and POS server 4 are executing a printing-related process, the printer controller 30 of the printing device 3 defers the processes based on the printing command and non-printing command from the maintenance server 2. Then after executing the printing command received from the POS server 4, the printer controller 30 executes the processes based on the printing command and non-printing command received continuously from the maintenance server 2 in the order that the commands were received. As a result, the printing device 3 can run the processes based on the printing command and non-printing command received from the maintenance server 2 while preventing executing a process based on a non-printing command that does not reflect a process based on a printing command.

Note that the operation of the store system described above uses the example of the POS server 4 executing a printing process with the printing device 3 before the maintenance server 2, but the store system operates in the same way when the maintenance server 2 executes a printing process with the printing device 3 before the POS server 4. More specifically, if a non-printing command is received from the POS server 4 while the maintenance server 2 and printing device 3 are executing a printing process, the printing device 3 executes the process based on the non-printing command received from the POS server 4 parallel to the printing process with the maintenance server 2. However, when the printing device 3 receives a printing command from the POS server 4, the printing device 3 does not execute a process based on the received printing command. If a non-printing command is received after a printing command from the POS server 4 is received while the maintenance server 2 and printing device 3 are executing a printing-related process, the printing device 3 does not execute the processes based on the received printing command and non-printing command.

As described above, a store system 1 (network system) according to this embodiment has a POS server 4, a maintenance server 2, and one or more printing devices 3 connected through a local area network LN (network). The POS server 4 and maintenance server 2 can send to a printing device 3 printing commands (first command) belonging to a printing command group (first command group) instructing running a process involving operating the print mechanism of the printing device 3, and non-printing commands (second command) belonging to a non-printing command group (second command group) instructing executing a process not involving operating the print mechanism of the printing device 3.

The printing device 3 does not execute processes based on printing commands received from the maintenance server 2 if the printing command from the maintenance server 2 is received while running a process based on a printing command received from the POS server 4. However, if a non-printing command is received from the maintenance server 2 while the printing device 3 is running a process based on a printing command received from the POS server 4, the printing device 3 runs the process based on the received non-printing command parallel to the process based on the printing command received from the POS server 4.

If a printing command is received from the POS server 4 while running a process based on a printing command received from the maintenance server 2, the printing device 3 does not execute the process based on the printing command received from the POS server 4. However, if the printing device 3 receives a printing command from the maintenance server 2, is running a process based on the printing command, and then receives a non-printing command from the POS server 4 while executing the printing process, the printing device 3 executes the process based on the non-printing command parallel to the process based on the printing command received from the maintenance server 2.

If a command received from another server while executing a process involving operating the print mechanism is a printing command, the printing device 3 thus does not execute the process involving operating the print mechanism with the other server, but if a non-printing command is received, executes the process not involving operating the print mechanism with the other server. As a result, the printing device 3 can prevent delaying processes not involving operating the print mechanism while executing a process involving operating the print mechanism, while also preventing executing parallel processes involving operating the print mechanism.

When the printing device 3 receives a printing command from the POS server 4 and then receives a printing command from the maintenance server 2 while running the process based on the printing command received from the POS server 4, the printing device 3 defers executing the process based on the printing command received from the maintenance server 2, and then runs the process based on the printing command received from the maintenance server 2 after executing the process based on the printing command received from the POS server 4.

If the printing device 3 receives a printing command from the maintenance server 2 and then receives a printing command from the POS server 4 while running the process based on the printing command received from the maintenance server 2, the printing device 3 defers executing the process based on the printing command received from the POS server 4, and then runs the process based on the printing command received from the POS server 4 after executing the process based on the printing command received from the maintenance server 2.

As a result, because the printing device 3 executes the process based on a printing command received from a second server after executing the process involving operating the print mechanism, the printing device 3 can execute a process based on a printing command received from a second server while preventing executing parallel processes involving operating the print mechanism.

When the printing device 3 receives a printing command from the POS server 4, is running a process based on the received printing command, and then receives a printing command and then a non-printing command from the maintenance server 2, the printing device 3 defers executing the processes based on the printing command and non-printing command received from the maintenance server 2. After the process based on the printing command received from the POS server 4 ends, the printing device 3 then executes the process based on the printing command and then the process based on the non-printing command received from the maintenance server 2.

When the printing device 3 receives a printing command from the maintenance server 2, is running a process based on the received printing command, and then receives a printing command and then a non-printing command from the POS server 4, the printing device 3 defers executing the processes based on the printing command and non-printing command received from the POS server 4. After the process based on the printing command received from the maintenance server 2 ends, the printing device 3 then executes the process based on the printing command and then the process based on the non-printing command received from the POS server 4.

The printing device 3 thus defers executing processes based on a printing command and a non-printing command received from a second server until the process based on a printing command received from a first server ends, and then sequentially executes the processes based on the first command and second command received from the second server. As a result, when the received non-printing command instructs executing a process related to a process based on a printing command that was received first, the printing device 3 can appropriately execute processes based on the printing command and non-printing command received from the second server while preventing executing a process based on a non-printing command that cannot reference the process based on the printing command.

The disclosure is described above with reference to a preferred embodiment thereof, but the disclosure is not limited thereto and can be modified and adapted in many ways without departing from the scope of the accompanying claims.

The disclosure is described above using the store system 1 deployed in a store, but the facility in which the store system 1 is deployed is not limited to stores.

The printer 3 in the foregoing embodiment is described using thermal recording method, but the recording method is not so limited.

Function blocks in the foregoing embodiments may also be configured as desired by the cooperation of hardware and software, and do not suggest a specific hardware configuration.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A network system comprising:
   a plurality of servers including a first processor; and
   a printing device, connected through a network to the plurality of servers, including a second processor and configured to print to recording media connected through a network, wherein:
   the first processor of the servers is configured to transmit a first command belonging to a first command group instructing executing a process involving operation of hardware in the printing device, or a second command belonging to a second command group instructing executing a process not involving operation of hardware in the printing device, and
   when the printing device receives a first command from one server and is executing a process based on the received first command, the second processor of the printing device is configured to:
   not execute a process based on a first command received from another server that is different from the one server, but
   execute, when a second command is received from another server that is different from the one server, the process based on the received second command parallel to the process based on the first command received from the one server.

2. The network system described in claim 1, wherein:
   when the first command is received from the one server and a first command is then received from another server while executing the process based on the first command received from the one server, the second processor of the printing device is further configured to:
defer executing the process based on the first command received from the another server, and
execute the process based on the first command received from the another server after executing the process based on the first command received from the one server.

3. The network system described in claim 1, wherein:
when the first command is received from one server and a first command and then a second command are received from another server while executing the process based on the first command received from the one server, the second processor of the printing device is configured to:
defer executing the process based on the first command and second command received from the another server, and
execute the process based on the first command and second command received from the another server after executing the process based on the first command received from the one server.

4. The network system described in claim 1, wherein:
the first command is a command instructing executing a process involving operating a print mechanism; and
the second command is a command instructing transmitting information related to the printing device.

5. A printing device configured to connect through a network to multiple servers, and comprising:
a processor; and
memory,
wherein the processor is configured to:
communicate with the servers,
execute a process based on a first command belonging to a first command group instructing executing a process involving operation of hardware when the first command is received from one server,
not execute a process based on a first command received from another server different from the one server when the first command is received from another server different from the one server while executing the process based on the first command received from the one server, and
execute a process based on a second command belonging to a second command group instructing executing a process not involving operation of hardware when the second command is received from another server different from the one server while executing the process based on the first command received from the one server.

6. The printing device described in claim 5, wherein:
when the first command is received from one server and a first command is then received from another server while executing the process based on the first command received from the one server, the processor is further configured to
defer executing the process based on the first command received from the another server, and
execute the process based on the first command received from the another server after executing the process based on the first command received from the one server.

7. The printing device described in claim 5, wherein:
when the first command is received from one server and a first command and then a second command are received from another server while executing the process based on the first command received from the one server, the processor is further configured to:
defer executing the process based on the first command and second command received from the another server, and
execute the process based on the first command and second command received from the another server after executing the process based on the first command received from the one server.

8. A control method of a printing device that connects through a network to multiple servers, comprising
when a first command belonging to a first command group instructing executing a process involving operation of hardware is received from one server and a process is executed based on the received first command, not executing, by a processor of the printing device, a process based on a first command received from another server different from the one server, and
executing, by the processor of the printing device, a process based on a received second command when a second command belonging to a second command group instructing executing a process not involving operation of hardware is received from another server different from the one server, while executing the process based on the first command received from the one server.

9. The control method of a printing device described in claim 8, further comprising:
when the first command is received from the one server and a first command is then received from another server different from the one server while executing the process based on the first command received from the one server,
deferring, by the processor of the printing device, executing the process based on the first command received from the another server, and
executing, by the processor of the printing device, the process based on the first command received from the another server after executing the process based on the first command received from the one server.

10. The control method of a printing device described in claim 8, further comprising:
when the first command is received from the one server and a first command and then a second command are received from another server while executing the process based on the first command received from the one server,
deferring, by the processor of the printing device, executing the process based on the first command and second command received from the another server, and
executing, by the processor of the printing device, the process based on the first command and second command received from the another server after executing the process based on the first command received from the one server.

* * * * *